(12) United States Patent
Haggerty et al.

(10) Patent No.: US 10,781,669 B2
(45) Date of Patent: Sep. 22, 2020

(54) SIMULATED WELLBORE CONTROL FOR DYNAMIC UNDERBALANCE TESTING

(71) Applicant: Halliburton Energy Services, Inc., Houston, TX (US)

(72) Inventors: Dennis J. Haggerty, Burleson, TX (US); John Douglas Manning, Alvarado, TX (US); Jacob Andrew McGregor, Burleson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 15/563,779

(22) PCT Filed: Jan. 13, 2017

(86) PCT No.: PCT/US2017/013491
§ 371 (c)(1),
(2) Date: Oct. 2, 2017

(87) PCT Pub. No.: WO2018/132105
PCT Pub. Date: Jul. 19, 2018

(65) Prior Publication Data
US 2018/0298732 A1    Oct. 18, 2018

(51) Int. Cl.
*E21B 41/00*    (2006.01)
*E21B 43/116*    (2006.01)
(52) U.S. Cl.
CPC ........ *E21B 41/0092* (2013.01); *E21B 43/116* (2013.01)
(58) Field of Classification Search
None
See application file for complete search history.

(56) References Cited

U.S. PATENT DOCUMENTS

| 4,932,239 A | 6/1990 | Regalbuto |
| 8,215,397 B2 * | 7/2012 | Griffith ............... E21B 43/1195 166/297 |

(Continued)

FOREIGN PATENT DOCUMENTS

CN    105350946 A    2/2016

OTHER PUBLICATIONS

Devadass, Melvin. "Increasing Oil Well Production by Maximizing Under-balance during Perforation", 3M, Nov. 2007, 4 pages. (Year: 2007).*

(Continued)

*Primary Examiner* — Suzanne Lo
(74) *Attorney, Agent, or Firm* — John W. Wustenberg; Baker Botts L.L.P.

(57) ABSTRACT

To optimize the efficiency of a perforating tool system, downhole conditions may be simulated to determine the optimal configuration for the perforating tool system. A simulated wellbore is disposed in a simulated wellbore case and coupled to a formation sample. The simulated wellbore comprises the perforating tool system and one or more filler discs that consume a volume of the simulated wellbore. The filler discs are used to control the dynamic underbalance for a given simulation of a perforating tool system. One or more measurements associated with the perforating tool system along with one or more images may be generated after explosive charges of the perforating tool system are detonated. The perforating tool system may be modified based, at least in part, on the one or more measurements and the one or more images for the specific dynamic underbalance of the simulation.

20 Claims, 6 Drawing Sheets

(56) References Cited

U.S. PATENT DOCUMENTS

| | | |
|---|---|---|
| 2009/0217739 A1 | 9/2009 | Hardesty et al. |
| 2009/0241700 A1* | 10/2009 | Haggerty ................ E21B 49/00 73/865.6 |
| 2013/0312510 A1* | 11/2013 | Brooks ................... E21B 43/11 73/152.01 |
| 2016/0138394 A1 | 5/2016 | Brooks et al. |

OTHER PUBLICATIONS

Bakker et al. "The New Dynamics of Underbalanced Perforating", Oilfield Review, Winter 2003/2004, pp. 54-67. (Year: 2004).*
Grove et al. "Perforation Cleanup by Means of Dynamic Underbalance: New Understanding", Mar. 2013 SPE Drilling & Completion, pp. 11-20. (Year: 2013).*
International Search Report and Written Opinion issued in related PCT Application No. PCT/US2017/013491 dated Sep. 22, 2017, 16 pages.

* cited by examiner

SIMULATED WELLBORE CONTROL FOR DYNAMIC UNDERBALANCE TESTING

CROSS-REFERENCE TO RELATED APPLICATION

The present application is a U.S. National Stage Application of International Application No. PCT/US2017/013491 filed Jan. 13, 2017, which is incorporated herein by reference in its entirety for all purposes.

TECHNICAL FIELD

The present disclosure relates generally to evaluation of equipment utilized and operations performed in conjunction with a subterranean well, more particularly, to controlling the dynamic underbalance in testing and simulation of a perforating tool system.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Measurements of the subterranean formation may be made throughout the operations to characterize the formation and aide in making operational decisions. In certain instances, a communication interface of a downhole tool may be used to communicate data associated with measurements of the formation or other downhole parameters.

A perforating tool system is commonly used to maximize the potential recovery of such hydrocarbons. However, for a given operation, the perforating tool system may be selected based on little to no knowledge of the likely downhole charge performance. For example, a selection of a perforating tool system may be based on an American Petroleum Institute Recommended Practices (API RP) 19B Section 1 test data that evaluates only specific strength or formulated cement penetration among competing perforating tool systems and various compositions of cement. Cement penetration, though, does not always correlate to the penetration in a downhole environment or inflow potential. Additional data is necessary to more accurately select and configure the appropriate perforating tool system for a given operation.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

Copper wires may be used within a downhole tool to communicate between electrical components and electrical tools. However, copper wires are prone to degrading over time along with the connectors used to connect multiple tools together. Providing an optical splash communication system that is independent of any cables or fibers reduces failures of enclosure or tool due to breakage or connector failures. Further, optical splash communications may not be affected by the presence of electric or magnetic fields that typically cause interference with signals sent over copper cabling. Using optical splash signals for communication effectively immunizes the optical splash communication system from inductive coupling, electromagnetic interference, and ground loops. In some embodiments, visible light is used to communicate data between downhole electrical components which minimizes the risk of detection of the data by unauthorized or unintended users. One or more embodiments of the present disclosure provide for downhole communications that are reliable and able to withstand the downhole environment.

The dynamic underbalance (DUB) in a perforating tool testing system, for example, in an American Petroleum Institute Recommended Practices (API RP) 19B Section 2 or Section 4 Test system, may be controlled by adjusting the wellbore chamber volume in conjunction with adjusting the free gun volume in a simulated perforator gun. DUB control may ensure a given well operation achieves maximum production or injection by creating a clean, open perforation tunnel. DUB control may also be used to prevent perforation tunnel collapse or unwanted sand flow into the well by reducing the magnitude or mitigating pressure drop in the wellbore during a perforation event or operation.

Figure 1:
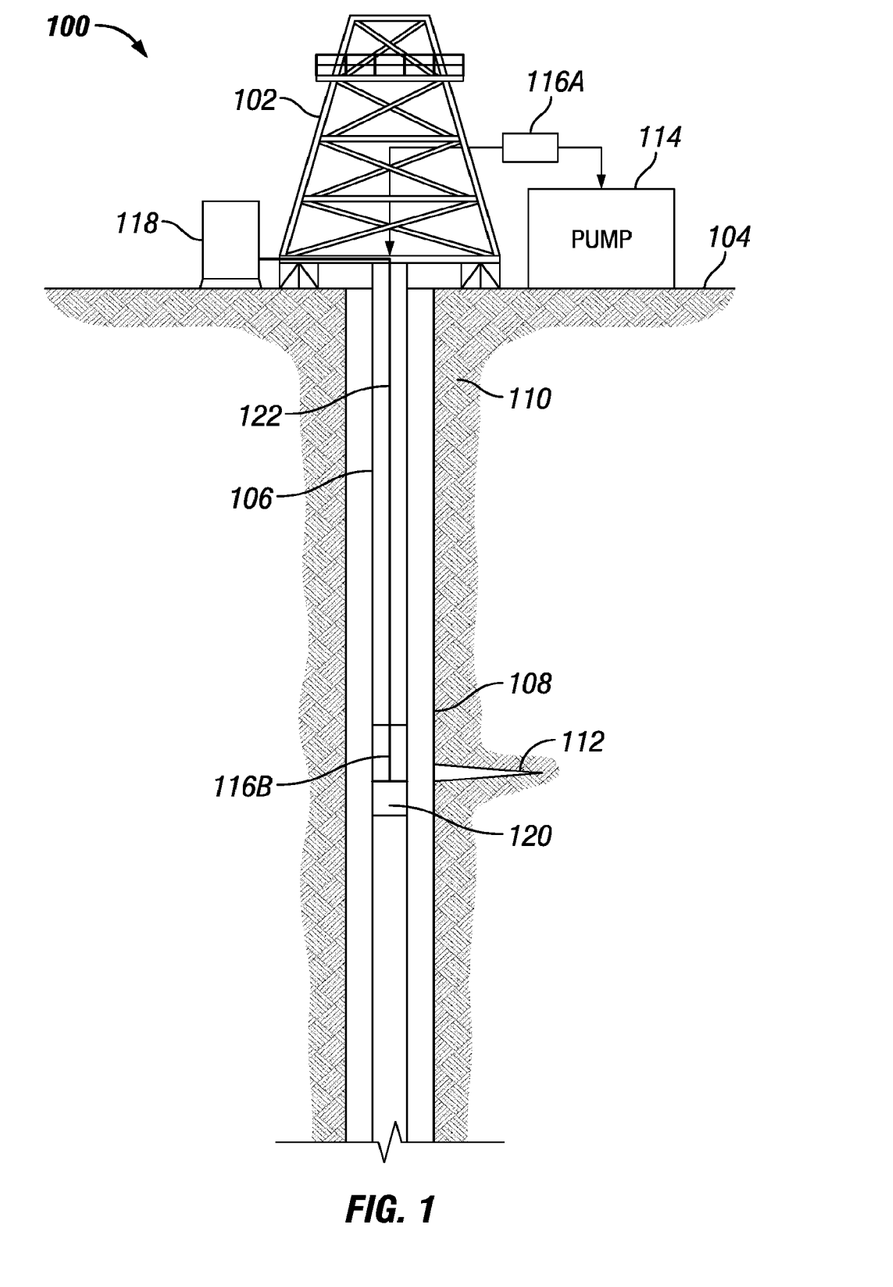
FIG. 1 is a diagram showing an illustrative well system with a perforating tool system, according to aspects of the present disclosure.

Various aspects of the present disclosure may be implemented in various environments. For example, FIG. 1 is a diagram showing an illustrative well system 100 with a perforating tool system, according to aspects of the present disclosure. The well system 100 includes a derrick 102 positioned at a surface 104. The derrick 102 may support components of the well system 100, including a tubing string 106. The tubing string 106 may include segmented pipes that extend below the surface 10 and into a wellbore 108. The wellbore 108 may extend through subterranean formations 110 in the earth adjacent to the wellbore 108. The subterranean formations 110 may include a perforation, an opening or a fracture 112, referred to generally herein as fracture 112. In some aspects, the fracture 112 may be a separation of the subterranean formations 110 forming a fissure or crevice in the subterranean formations 110. In additional aspects, the fracture 112 may be created by a fracturing process in which highly pressured gas is forced into the formations 110 via perforating tool system or assembly 120. A pump 114 is positioned at the surface 104 proximate to the wellbore 108 to pump a fluid into the wellbore. The fluid may be pumped into the wellbore at a rate to expand the fracture 112 or to fill a perforation or fracture 112. The fracture 112 may serve as a path for the production of hydrocarbons from subterranean reservoirs. A slow-injection pumping device 116 may be included to inject additional fluid into the fracture 112 to further open or extend the fracture 112 in the subterranean formation 110. In one or more aspects, the slow-injection pumping device 116 may be positioned at the surface as depicted by block 116A in FIG. 1. In alternative aspects, the slow-injection pumping device 116 may be positioned on the tubing string 106 as depicted by block 116B. Proppant and other additives may be added to the fluid during or prior to the fluid traversing the pump 114. The proppant may remain in the fracture 112 after the fracturing process is completed to keep the fracture 112 from completely closing. Although the slow-injection pumping device 116 is shown as positioned on a tubing string 106 downhole in the wellbore 108, all, or a portion of, the slow-injection pumping device 116 may be positioned on the surface 104. For example, the slow-injection pumping device 116 may be positioned on the surface 104 downstream of the pump 114.

A perforating tool system 120, configured or calibrated according to one or more aspects of the present disclosure, may also be positioned or deployed downhole. In one or more embodiments, perforating tool system 120 may be positioned along, included with or coupled to the tubing string 106, a bottom-hole assembly, or any other suitable downhole deployment device or tool. Perforating tool system 120 may comprise shaped charges or explosive charges that when detonated create a tunnel (for example, fracture 112) through the casing or liner disposed within the wellbore 108 into the formation 110. The perforating tool system 120 may be coupled via an electrical connection 122 to a control unit 118 at the surface 104.

In one or more embodiments, control unit 118 may be positioned downhole or remote from the wellbore environment 100. Control unit 118 may transmit a signal to perforating tool system 120 to detonate the explosive charges (not shown) disposed within the perforating tool system 120. In one or more embodiments, electrical connection 122 may be any material suitable for conveying an electrical signal including but not limited to a wireline, one or more cables (such as a detonator cable), or any other suitable conductive wire or connection. Perforating tool system 120 may be configured according to any one or more aspects of the present disclosure.

Figure 2:
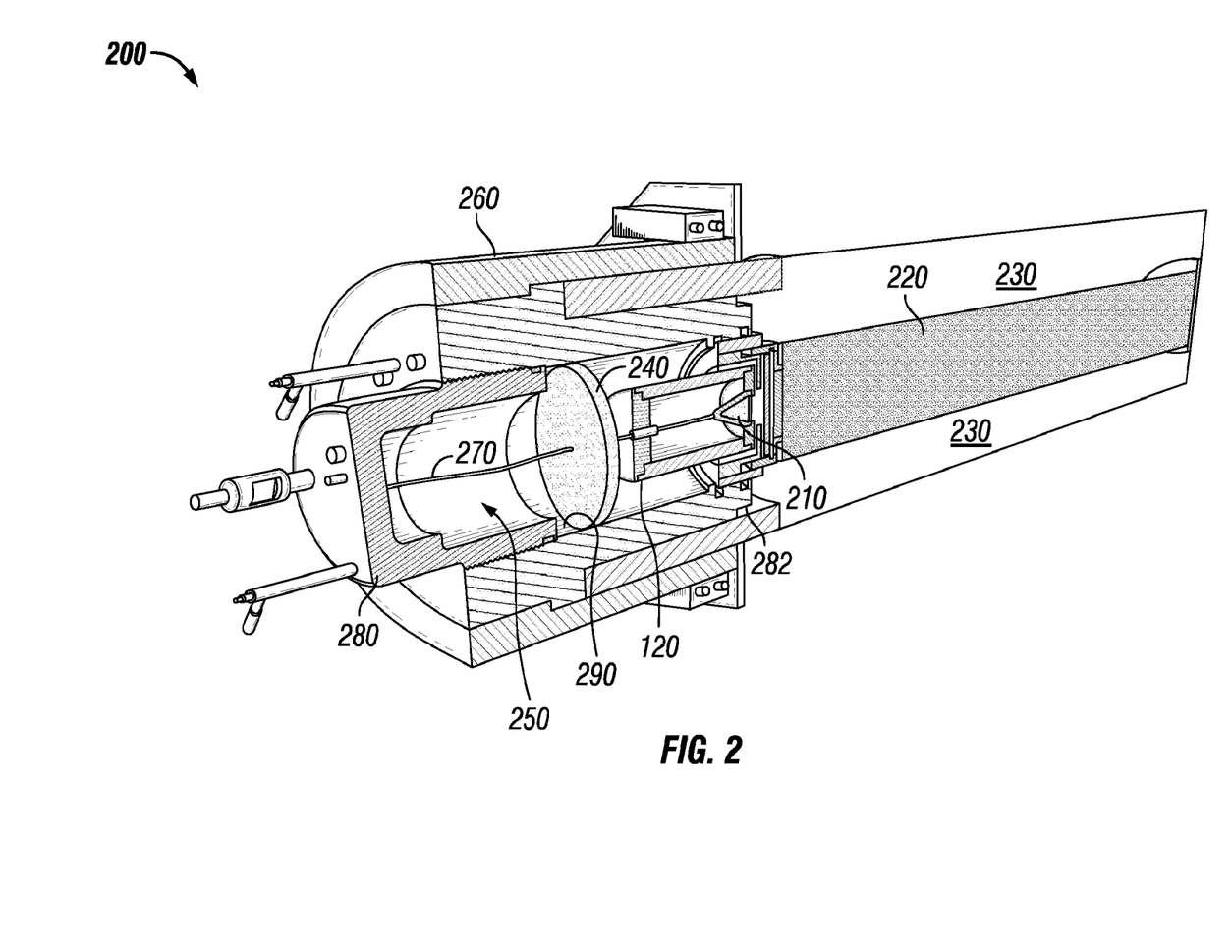
FIG. 2 is a diagram showing an illustrative cross-section view of a perforating tool testing system, according to aspects of the present disclosure.

FIG. 2 is a diagram showing an illustrative cross-section view perforating tool testing system 200, according to aspects of the present disclosure. The perforating tool testing system 200, comprises a simulated wellbore case 260. Simulated wellbore case 260 may be cylindrically shaped as illustrated in FIG. 2. In one or more embodiments simulated wellbore case 260 may be any suitable shape that permits simulation of a perforation tool system 120 according to one or more aspects of the present disclosure. A simulated wellbore 250 is disposed within the simulated wellbore case 260 and coupled to a formation sample 220. The simulated wellbore 250 is pressurized to apply a pressure that approximates a wellbore pressure to the perforating tool system 120. The simulated wellbore 250 may comply with the API RP 19 Section 2 and Section 4 wellbore cavity requirements.

A perforating tool system 120 is disposed within the simulated wellbore 250 of the simulated wellbore case 260. The perforating tool system 120 comprises an explosive charge 210. The perforating tool system 120 may be arranged or include any one or more components required for a given operation. A detonation cord 270 may couple to the explosive charge 210 of the perforating tool system 120.

The detonation cord 270 may pass through an aperture (not shown) at one end of the perforating tool system 120 or any other location of the perforating tool system 120. The detonation cord 270 may be directly or indirectly coupled to or electrically or communicatively coupled to a power source or information handling system such that an electrical signal causes the detonation of the explosive charge 210. The detonation of explosive charge 210 may be controlled manually or by executing one or more instructions of a software program stored in a non-transitory memory on an information handling system. While only one explosive charge 210 is illustrated, the present disclosure contemplates any number of explosive charges 210 in any number of configurations.

One or more filler discs 240 may be disposed within a cavity of the simulated wellbore 250 between a simulated wellbore cap 280 of the simulated wellbore 250 and the perforating tool system 120. The one or more filler discs 240 may fit flush against the interior wall 290 of the simulated wellbore 250 or be of any other suitable dimensions according to a wellbore operation. The filler discs 240 may comprise aluminum or any other suitable material. The filler discs 240 reduce the volume or empty space of the cavity of the simulated wellbore 250. The more volume that is consumed by the filler discs 240, the deeper and more profound the pressure reduction experienced (DUB effect) post-detonation of the explosive charge 210. A filler disc 240 may comprise any size, dimension, or thickness suitable for a given operation. A face plate 282 may be disposed within the simulated wellbore 250 between the perforating tool system 120 and the formation sample 220 includes, for example, a simulated casing or cement. The face plate 282 may comprise steel and may be backed by a cement layer. In one or more embodiments the perforating tool system 120 and the formation sample 220 couple directly or indirectly to the face plate 282. In one or more embodiments, the perforating tool system is disposed or positioned within the face plate 282, for example, seated in one or more grooves (not shown) of the face plate 282.

The perforating tool testing system 200 may comprise one or more overburden fluid chambers 230 disposed about the formation sample 220 The overburden fluid chambers 230 may comprise overburden fluid used to apply an overburden pressure during a simulation to simulate overburden stress on the formation sample 220.

Figure 3:
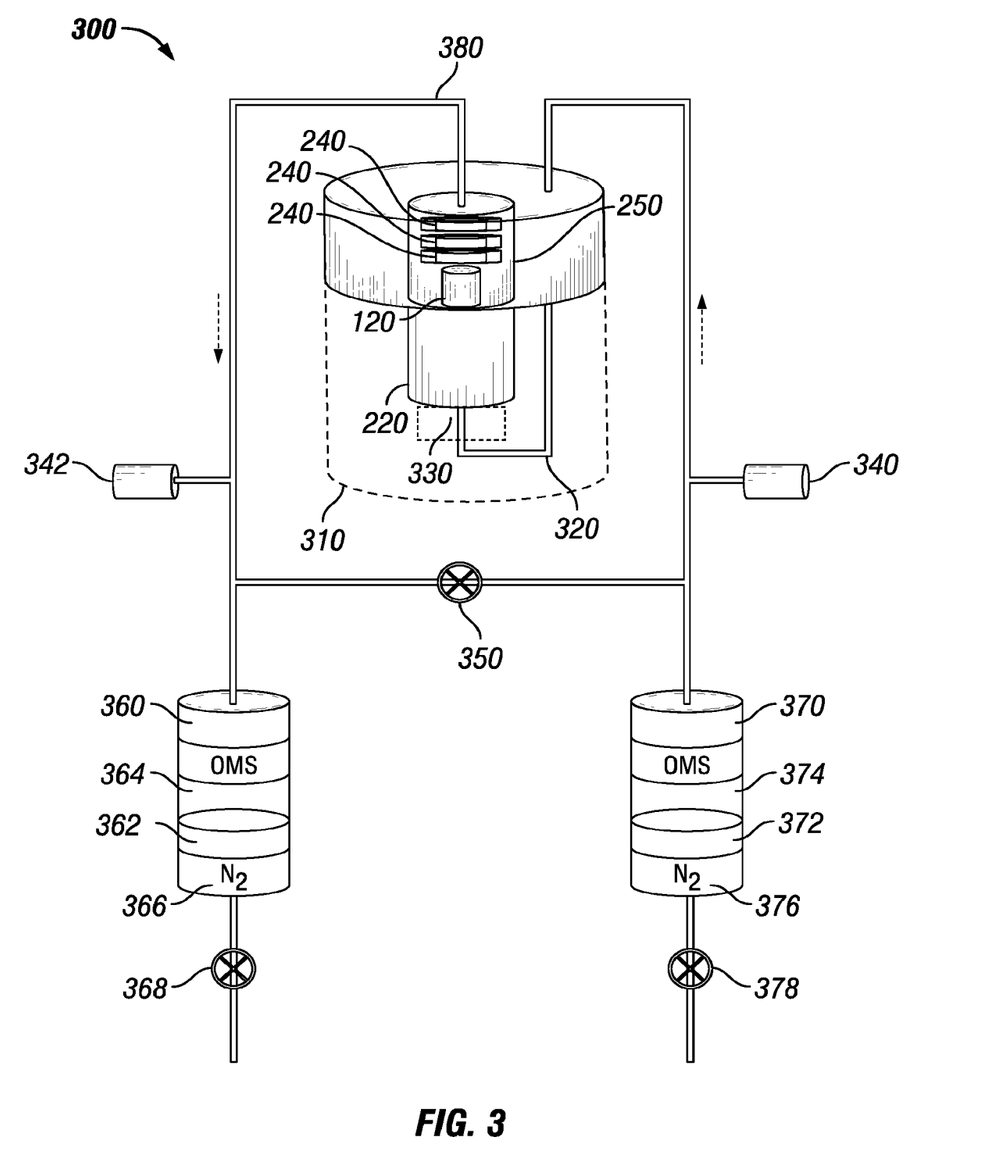
FIG. 3 is a diagram of a perforating tool testing system, according to aspects of the present disclosure.

FIG. 3 is a diagram of a perforating tool testing system 300, according to one or more aspects of the present disclosure. Perforating tool testing system 300 may be the same as or similar to perforating tool testing system 200 in FIG. 2. FIG. 3 illustrates a simulated wellbore 250 that comprises one or more filler discs 240 and a perforating tool system 120, a sample formation 220, a flow distributor 330 and a flow line 320 disposed within a pressure vessel 310. The perforating tool system 120 is disposed adjacent a sample formation 220 to simulate a perforation or fracturing operation. A flow distributor 330 couples to or engages with sample formation 220 to evenly distribute pressurized fluid from flow line 320 to create or expand a perforation in the sample formation 200. This even distribution of pressurized fluid towards a perforation enables assessment of DUB performance.

The perforating tool system 300 may comprise a wellbore accumulator 360 and a pore accumulator 370. The pore accumulator 370 may comprise a fluid chamber 374. The fluid chamber 374 may be filled with a pressurization fluid, for example, odorless mineral spirits (OMS), formulated brine, mud, kill pill, completion fluid, stimulation fluid, or any other fluid suitable for a given operation or simulation. Each type of fluid in the fluid chamber 374 may affect the DUB differently due to the intrinsic properties (for example, viscosity and rheological properties) of the fluid. The pore accumulator 370 may comprise a gas reservoir 376. The gas reservoir 376 may be filled with a Nitrogen gas. The pore accumulator 370 may comprise a piston 372 that applies a force to the fluid chamber 374 to cause fluid to flow via flow line 320 to the flow distributor 330. The pore accumulator 370 may comprise a bypass valve 378 to control the pressure of the pore accumulator 370. A pressure transducer 340 may couple to the flow line 320 to measure the pressure of the fluid flowing from the pore accumulator 370 to the flow distributor 330.

The wellbore accumulator 360 may comprise a fluid chamber 364. The fluid chamber 364 may be filled with a pressurization fluid, for example, odorless mineral spirits (OMS), formulated brine, mud, kill pill, completion fluid, stimulation fluid, or any other fluid suitable for a given operation or simulation. Each type of fluid in the fluid chamber 364 may affect the DUB differently due to the intrinsic properties (for example, viscosity and rheological properties) of the fluid. The wellbore accumulator 360 may comprise a gas reservoir 366. The gas reservoir 366 may be filled with a Nitrogen gas. The wellbore accumulator 360 may comprise a piston 362 to isolate and control a force to the fluid chamber 364 to cause fluid to flow via flow line 380 from the simulated wellbore 250. The pore accumulator 370 may comprise a bypass valve 368 to control the pressure of the wellbore accumulator 370. A pressure transducer 342 may couple to the flow line 380 to measure the pressure of the fluid flowing from the wellbore 250 to the wellbore accumulator 360. A bypass valve 350 may couple to the flow line 320 and the flow line 380 to equalize pressure between the pore accumulator 370 and the wellbore accumulator 360. Equalizing this pressure stops the flow of the fluid.

Figure 4:
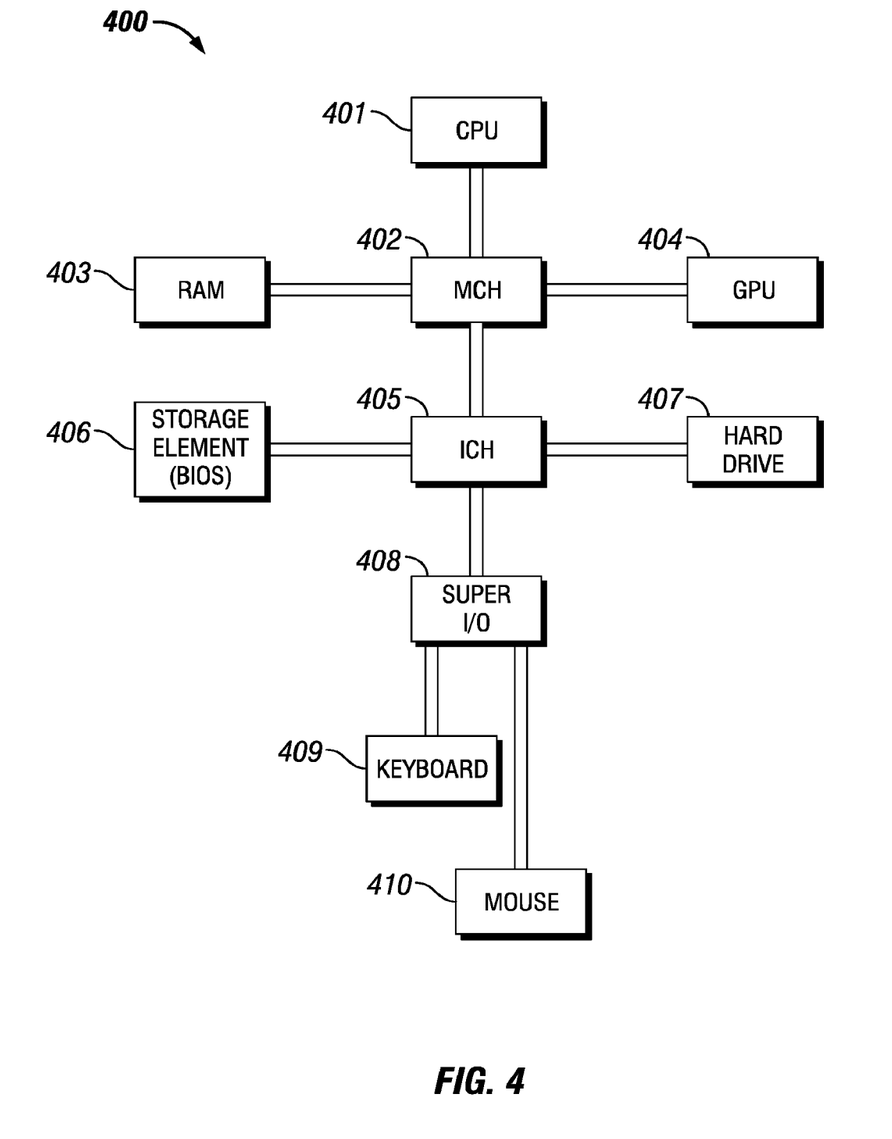
FIG. 4 is a diagram of an information handling system, according to one or more aspect of the present invention.

FIG. 4 is a diagram illustrating an example information handling system 400, according to aspects of the present disclosure. The control unit 118 may take a form similar to the information handling system 400. A processor or central processing unit (CPU) 401 of the information handling system 400 is communicatively coupled to a memory controller hub or north bridge 402. The processor 401 may include, for example a microprocessor, microcontroller, digital signal processor (DSP), application specific integrated circuit (ASIC), or any other digital or analog circuitry configured to interpret and/or execute program instructions and/or process data. Processor 401 may be configured to interpret and/or execute program instructions or other data retrieved and stored in any memory such as memory 403 or hard drive 407. Program instructions or other data may constitute portions of a software or application for carrying out one or more methods described herein. Memory 403 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 403 for execution by processor 401.

Modifications, additions, or omissions may be made to FIG. 4 without departing from the scope of the present disclosure. For example, FIG. 4 shows a particular configuration of components of information handling system 400. However, any suitable configurations of components may be used. For example, components of information handling system 400 may be implemented either as physical or logical components. Furthermore, in some embodiments, functionality associated with components of information handling system 400 may be implemented in special purpose circuits or components. In other embodiments, functionality associated with components of information handling system 400 may be implemented in configurable general purpose circuit or components. For example, components of information handling system 400 may be implemented by configured computer program instructions.

Memory controller hub 402 may include a memory controller for directing information to or from various system memory components within the information handling system 400, such as memory 403, storage element 406, and hard drive 407. The memory controller hub 402 may be coupled to memory 403 and a graphics processing unit 404. Memory controller hub 402 may also be coupled to an I/O controller hub or south bridge 405. I/O hub 405 is coupled to storage elements of the information handling system 400, including a storage element 406, which may comprise a flash ROM that includes a basic input/output system (BIOS) of the computer system. I/O hub 405 is also coupled to the hard drive 407 of the information handling system 400. I/O hub 405 may also be coupled to a Super I/O chip 408, which is itself coupled to several of the I/O ports of the computer system, including keyboard 409 and mouse 410.

Figure 5:
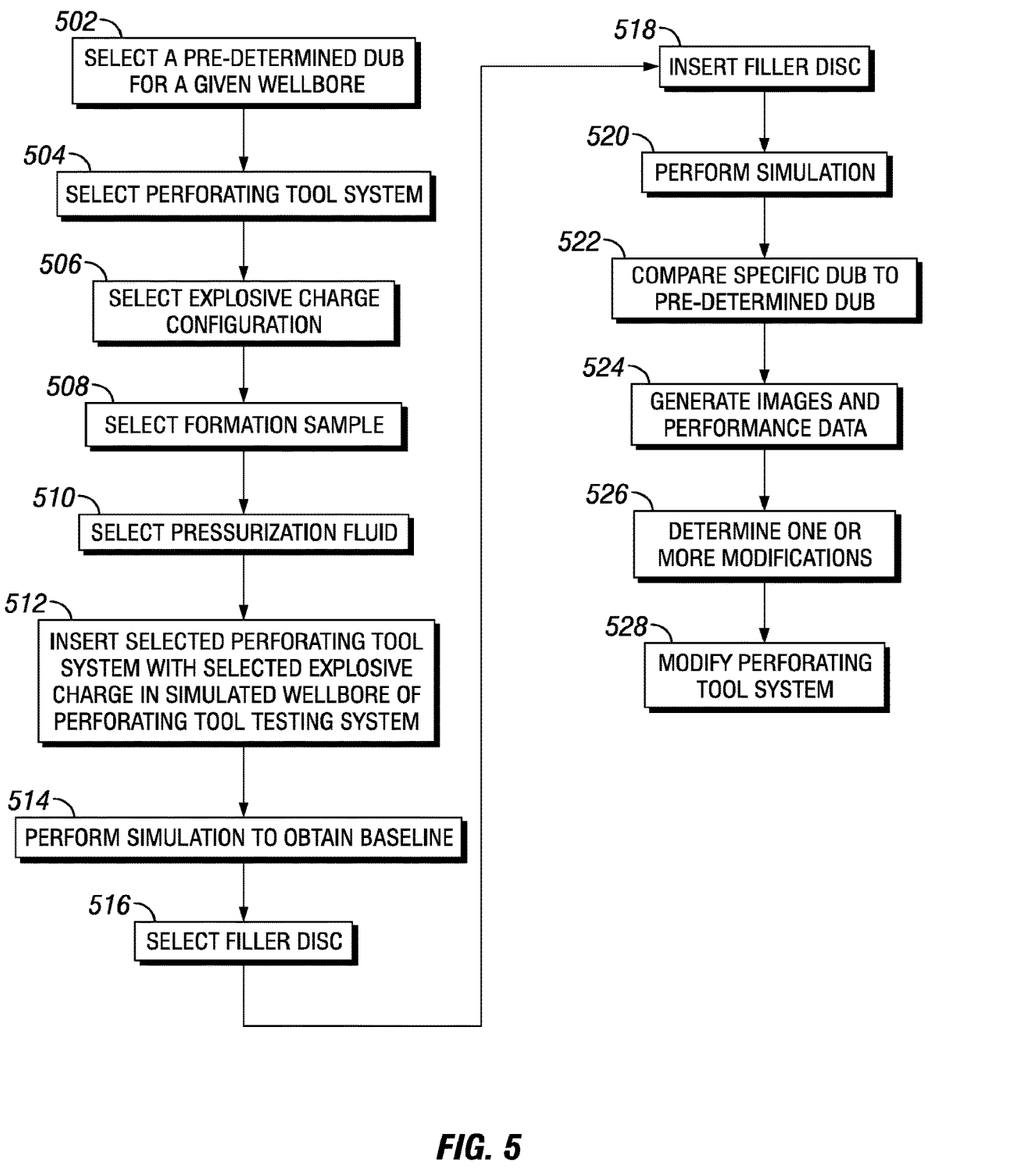
FIG. 5 is a flowchart of a method for testing and simulation of a perforating tool system, according to aspects of the present disclosure.

FIG. 5 is a flowchart of a method for testing and simulation of a perforating tool system, according to aspects of the present disclosure. At step 502, a predetermined DUB for a given wellbore or wellbore operation is selected. This predetermined DUB is the target DUB for the perforating tool testing system. For example, a wellbore 108 may have a known (predetermined or target) DUB. To optimize operations using a given perforating tool system 120 (of FIG. 1), simulations may be performed that simulate the conditions of the wellbore 108, the formation 110 and the known DUB to determine the optimal configuration for a perforating tool system 120.

At step 504, the perforating tool system 120 is selected. For example, an operator of well system 100 may be using a specific type of perforating tool system 120 and may select that perforating tool system 120 for simulation. In one or more embodiments, the selected perforating tool system 120 may be selected based on any number of factors including, but not limited to, type of formation 110, wellbore 108, type of downhole fluids, current inventory, or any other factor or combination thereof. At step 506, the configuration for one or more explosive charges 210 for the selected perforating tool system 120 is selected. The same factors applicable to selecting the perforating tool system 120 may be applicable to selecting a configuration for one or more explosive charges 210.

At step 508, the formation sample 220 is selected. The formation sample may be selected based on the known formation type or based on expected types of formation for a given region. At step 510, the pressurization fluids for each of the pore accumulator 370 and the wellbore accumulator 360 are selected. The type of pressurization fluid may be selected based, at least in part, on the type of formation, the selected perforating tool system 120, the selected configuration of the one or more explosive charges 210, the wellbore 108, the pre-determined DUB, or any other factor or combination.

At step 512, the selected perforating tool system 120 with the selected configuration of the one or more explosive charges 210 is inserted into the simulated wellbore 150 of a perforating tool testing system 200. The perforating tool testing system 200 comprises the selected formation sample 220 that comprises the selected configuration of the one or more explosive charges 210 and the selected pressurization fluid.

At step 514 a simulation is performed using the selected components as discussed above. The simulated wellbore case 260 of the perforating tool testing system 200 is pressurized by setting an overburden pressure of the overburden fluid chambers 230 and setting a pore pressure of the selected formation sample 220 via the pore accumulator 370. An explosive charge 210 of the perforating tool system 120 is detonated. The DUB event occurs instantaneously and the resulting impact of the DUB event to the perforation tunnel may be assessed by removal of the formation sample 220, splitting of the formation sample 220 to expose the perforation tunnel or computerized tomography (CT) scanning the formation sample 220. Flow testing may be conducted to measure the ease at which a fluid flows into or out of the newly created perforation tunnel. The pressure in the simulated wellbore case 260 is reduced via the wellbore accumulator 360 to allow flow of fluid from the perforation tunnel or crevice. Any one or more of permeability and flow rate may be measured, collected, stored, or any combination thereof. The wellbore pressure is increased to match the pore pressure to stop the flow of fluid. The formation sample is retrieved and measurements are made of the perforation tunnel or crevices in the sample formation 220. Any one or more other measurements and images, for example, computerized tomography (CT) scans, may be generated or created as discussed with respect to steps 522 and 524.

In one or more embodiments step 514 is not necessary as no baseline measurements or images are required and the method continues to step 516. At 516, one or more filler discs 240 are selected based, at least in part, on any one or more of the pre-determined DUB, size of simulated wellbore 250, amount of empty space or remaining volume (cavity) in the simulated wellbore 250 between the simulated wellbore cap 280 and the perforating tool system 120, or any other criteria. The number of filler discs 240 is selected to decrease the volume or empty space of the simulated wellbore 250 to calibrate the perforating tool testing system 200 to the selected predetermined or target DUB. At step 518 the one or more selected filler discs 240 are disposed between a simulated wellbore cap 280 of the simulated wellbore 250 and the perforating tool system 120.

At step 520, a simulation is performed as described above with respect to step 514. The specific DUB associated with the simulation is determined or measured, for example, using a ballistic high speed gauge (not shown) and compared to the pre-determined DUB. In one or more embodiments, the specific or current DUB is compared to the predetermined DUB. For example, if the specific or current DUB and the predetermined DUB are within a pre-determined range or threshold of each other, then the method continues to step 524 and if not the method continues to step 516. At step 524, one or more flow tests are ran to measure productivity of the created or generated one or more images (such as a computer tomography "CT" scan) and one or more data associated with the performance of the perforating tool system 120 are generated. The one or more data associated with the performance of the perforating tool system 120 may comprise depth or magnitude or dimensions of the perforation tunnel (simulated fracture) created in the formation sample 220, hole geometry, amount of fill or loose material remaining inside the simulated wellbore case 260, and depth of last trace of disturbance. By controlling the dynamic underbalance, the perforation tunnel created may be extended to generate a better flow performance.

At step 526, one or more modifications are determined based, at least in part, on any one or more of the generated images, the specific DUB, amount of perforation tunnel or hole that remained and can potentially be removed, and the one or more data associated with the performance of the perforating tool system 120. For example, an optimal DUB is reached when the tunnel created in the formation sample 220 is empty, and a minimum DUB is reached at a first appearance of material in the tunnel, at step 528, the perforating tool system 120 is modified. The method may continue at step 512 or may end. In one or more embodiments, the modified perforating tool system 120 is deployed downhole in wellbore 108 of well system 100.

Figure 6A:
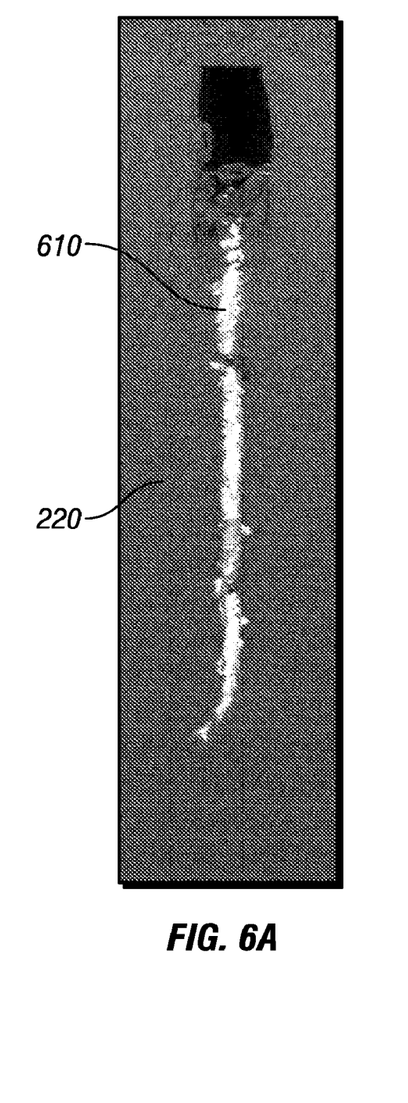
FIG. 6A and FIG. 6B illustrate example tunnels created by a perforating tool testing system, according to aspects of the present disclosure.
Figure 6B:
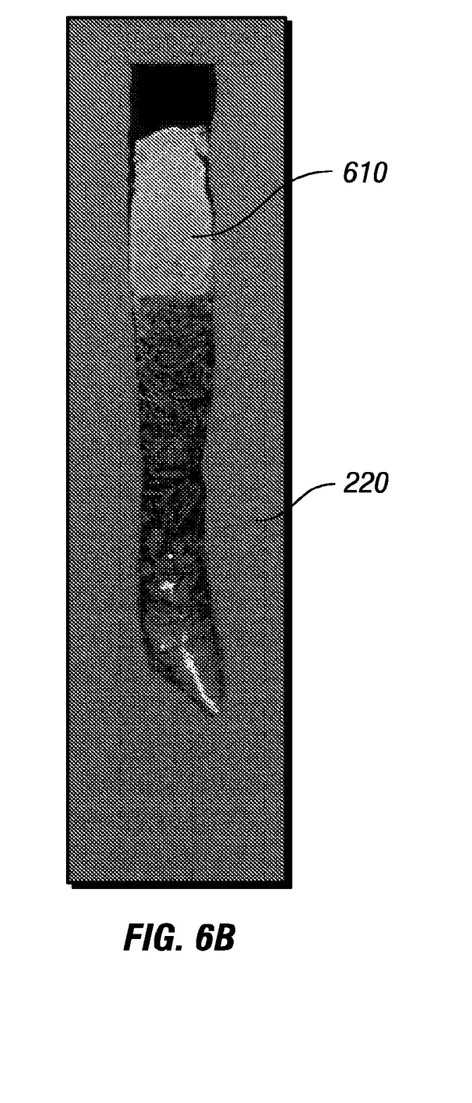

FIG. 6A and FIG. 6B illustrate example tunnels created by a perforating tool testing system, for example, perforating tool testing system 200 of FIG. 2 or perforating tool testing system 300 of FIG. 3. FIG. 6A illustrates a tunnel 610 created in formation sample 220 due to DUB effects but prior to any determination of an optimal DUB. FIG. 6B illustrates an enlarged tunnel 610 created in formation sample 220 due to DUB effects after modifications to the perforating tool system 120 to obtain an optimal DUB. Once flow of fluid through the tunnel 610 of FIG. 6B is initiated, any loose material contained within the tunnel 610 of FIG. 6B will be flushed out and optimum production will be achieved. The simulation results of FIG. 6B (and any one or more embodiments of the present disclosure) may be applicable to any formation, for example, to subterranean formation 110 in FIG. 1, to achieve optimum production of fluid, hydrocarbons or any other subterranean materials.

By performing testing and simulation of a perforating tool system 120 in the controlled environment of perforating tool testing systems 200 and 300, the performance of a perforating tool system selected for use downhole, for example, perforating tool system 120 of FIG. 1, may be determined above ground and optimized prior to deployment downhole which reduces costs of a given operation.

In one or more embodiments, a method of simulation for a perforating tool system comprises disposing a perforating tool system in a simulated wellbore of a simulated wellbore case, wherein the perforating tool system comprises one or more explosive charges, disposing a formation sample adjacent the perforating tool system in the simulated wellbore case, inserting one or more filler discs within a cavity of the simulated wellbore, wherein the one or more filler discs are based, at least in part, on at least one of a predetermined dynamic underbalance (DUB), size of the simulated wellbore, and size of the cavity, pressurizing the simulated wellbore, detonating the one or more explosive charges to create a perforation in the formation sample, generating at least one of one or more data associated with a performance of the perforating tool system and one or more images, determining a current DUB, and modifying the perforating tool system based, at least in part, on the at least one of the DUB, one or more data and the generated one or more images. In one or more embodiments, the method further comprises flowing a pressurized fluid through the perforating tool system into the perforation. In one or more embodiments, the method further comprises distributing the pressurized fluid evenly via a flow distributor coupled to the formation sample. In one or more embodiments, the method further comprises selecting the pressurized fluid based, at least in part, on one or more properties of the pressurized fluid, wherein the one or more properties affect the current DUB. In one or more embodiments the method further comprises altering the current DUB by selecting a different pressurized fluid. In one or more embodiments, the method further comprises altering the DUB by adding a filler disc to the one or more filler discs or removing a filler disc from the one or more filler discs. In one or more embodiments, the method further comprises determining if the pre-determined DUB and the current DUB are within a predetermined threshold. In one or more embodiments, the method further comprises running one or more flow tests to measure productivity of the generated one or more images.

In one or more embodiments, a simulated wellbore system comprises a simulated wellbore case, a simulated wellbore disposed within the simulated wellbore case, a face plate disposed at a first end of the simulated wellbore, a perforating tool system disposed within the wellbore between a second end and the first end of the simulated wellbore, a formation sample disposed within the simulated wellbore case, wherein the formation sample couples to the face plate, one or more explosive charges disposed within the perforating tool system, wherein the one or more explosive charges are disposed such that detonation of the explosive charges creates a perforation in the formation sample and one or more filler discs disposed within the simulated wellbore between the second end of the simulated wellbore and the perforating tool system, wherein the one or more filler discs affect a dynamic underbalance of the perforating tool testing system. In one or more embodiments, the simulated wellbore system further comprises a pore accumulator disposed within the simulated wellbore case, a wellbore accumulator disposed within the simulated wellbore case and a bypass valve coupled to the pore accumulator and the wellbore accumulator, wherein the bypass valve equalizes pressure between the pore accumulator and the wellbore accumulator to stop flow of a pressurized fluid into the formation sample. In one or more embodiments, the simulated wellbore system further comprises a flow distributor coupled to the formation sample, wherein the flow distributor distributes a pressurized fluid evenly to the formation sample. In one or more embodiments, the simulated wellbore system further comprises an information handling system, wherein the information handling system comprises a processor and a memory coupled to the processor, the memory containing one or more instructions that, when executed by the processor, cause the processor to generate one or more images associated with a perforation of the formation sample. In one or more embodiments, the one or more instructions further cause the processor to determine a current DUB and determine a modification of the simulated wellbore system based, at least in part, on the current DUB.

In one or more embodiments, a non-transitory computer readable medium storing one or more instructions that, when executed, causes a processor to determine a target dynamic underbalance (DUB) for a simulation of a wellbore operation, determine a perforating tool system for the simulation, determine a configuration for one or more explosive charges for the simulation, determine a formation sample for the simulation, determine a configuration of one or more filler discs based, at least in part, on the target DUB and perform a simulation, wherein performing the simulation comprises pressurizing a simulated wellbore case, detonating at least one of the one or more explosive charges to create a perforation in the formation sample, determining a current DUB, generating one or more images of the perforation and determining a modification to the simulation based, at least in part, on at least one of the current DUB and the generated one or more images. In one or more embodiments, performing the simulation further comprises flowing a pressurized fluid through the perforating tool system into the perforation. In one or more embodiments, the one or more instructions, when executed, further cause the processor to select a pressurized fluid based, at least in part, on one or more properties of the pressurized fluid, wherein the one or more properties affect the current DUB. In one or more embodiments, the one or more instructions, when executed, further cause the processor to determine if the pre-determined DUB and the current DUB are within a predetermined threshold. In one or more embodiments, the one or more instructions, when executed, further cause the processor to run one or more flow tests to measure productivity of the generated one or more images. In one or more embodiments, performing the simulation further comprises reducing pressure in the simulated wellbore case to allow flow of a fluid from the perforation. In one or more embodiments, the one or more instructions, when executed, further cause the processor to measure flow rate of the fluid from the perforation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A method of simulation for a perforating tool system, comprising:
    disposing a perforating tool system in a simulated wellbore of a simulated wellbore case, wherein the perforating tool system comprises one or more explosive charges;
    disposing a formation sample adjacent the perforating tool system in the simulated wellbore case;
    inserting one or more filler discs within a cavity of the simulated wellbore, wherein the one or more filler discs are based, at least in part, on at least one of a predetermined dynamic underbalance (DUB), size of the simulated wellbore, and size of the cavity;
    pressurizing the simulated wellbore;
    detonating the one or more explosive charges to create a perforation in the formation sample;
    generating at least one of one or more data associated with a performance of the perforating tool system and one or more images;
    determining a current DUB; and
    modifying the perforating tool system based, at least in part, on the at least one of the DUB, one or more data and the generated one or more images.

2. The method of simulation for the perforating tool system of claim 1, further comprising flowing a pressurized fluid through the perforating tool system into the perforation.

3. The method of simulation for the perforating tool system of claim 2, further comprising distributing the pressurized fluid evenly via a flow distributor coupled to the formation sample.

4. The method of simulation for the perforating tool system of claim 2, further comprising selecting the pressurized fluid based, at least in part, on one or more properties of the pressurized fluid, wherein the one or more properties affect the current DUB.

5. The method of simulation for the perforating tool system of claim 2, further comprising altering the current DUB by selecting a different pressurized fluid.

6. The method of simulation for the perforating tool system of claim 1, further comprising altering the DUB by adding a filler disc to the one or more filler discs or removing a filler disc from the one or more filler discs.

7. The method of simulation for the perforating tool system of claim 1, further comprising determining if the pre-determined DUB and the current DUB are within a predetermined threshold.

8. The method of simulation for the perforating tool system of claim 7, further comprising running one or more flow tests to measure productivity of the generated one or more images.

9. A simulated wellbore system, comprising:
    a simulated wellbore case;
    a simulated wellbore disposed within the simulated wellbore case;
    a face plate disposed at a first end of the simulated wellbore;
    a perforating tool system disposed within the wellbore between a second end and the first end of the simulated wellbore;
    a formation sample disposed within the simulated wellbore case, wherein the formation sample couples to the face plate;
    one or more explosive charges disposed within the perforating tool system, wherein the one or more explosive charges are disposed such that detonation of the explosive charges creates a perforation in the formation sample; and
    one or more filler discs disposed within the simulated wellbore between the second end of the simulated wellbore and the perforating tool system, wherein the one or more filler discs affect a dynamic underbalance of the perforating tool testing system.

10. A simulated wellbore system of claim 9, further comprising:
    a pore accumulator disposed within the simulated wellbore case;
    a wellbore accumulator disposed within the simulated wellbore case; and
    a bypass valve coupled to the pore accumulator and the wellbore accumulator, wherein the bypass valve equalizes pressure between the pore accumulator and the wellbore accumulator to stop flow of a pressurized fluid into the formation sample.

11. A simulated wellbore system of claim 9, further comprising a flow distributor coupled to the formation sample, wherein the flow distributor distributes a pressurized fluid evenly to the formation sample.

12. A simulated wellbore system of claim 9, further comprising an information handling system, wherein the information handling system comprises a processor and a memory coupled to the processor, the memory containing one or more instructions that, when executed by the processor, cause the processor to generate one or more images associated with a perforation of the formation sample.

13. A simulated wellbore system of claim 9, wherein the one or more instructions further cause the processor to:
    determine a current DUB; and determine a modification of the simulated wellbore system based, at least in part, on the current DUB.

14. A non-transitory computer readable medium storing one or more instructions that, when executed, causes a processor to:
  determine a target dynamic underbalance (DUB) for a simulation of a wellbore operation for a perforating tool testing system communicatively coupled to the processor;
  determine a perforating tool system of the perforating tool testing system for the simulation;
  determine a configuration for one or more explosive charges of the perforating tool system for the simulation;
  determine a formation sample for the simulation;
  determine a configuration of one or more filler discs disposed within a cavity of a simulated wellbore disposed in the simulated wellbore case of the perforating tool testing system based, at least in part, on the target DUB; and
  perform the simulation, wherein performing the simulation comprises:
    pressurizing a simulated wellbore of the simulated wellbore case of the perforating tool testing system;
    detonating at least one of the one or more explosive charges to create a perforation in the formation sample disposed adjacent to the perforating tool system;
    determining a current DUB of the perforating tool system;
    generating one or more images of the perforation; and
    determining a modification to the simulation based, at least in part, on at least one of the current DUB and the generated one or more images.

15. The non-transitory computer readable medium of claim 14, wherein performing the simulation further comprises flowing a pressurized fluid through the perforating tool system into the perforation.

16. The non-transitory computer readable medium of claim 15, wherein the one or more instructions, when executed, further cause the processor to select a pressurized fluid based, at least in part, on one or more properties of the pressurized fluid, wherein the one or more properties affect the current DUB.

17. The non-transitory computer readable medium of claim 14, wherein the one or more instructions, when executed, further cause the processor to determine if the pre-determined DUB and the current DUB are within a predetermined threshold.

18. The non-transitory computer readable medium of claim 14, wherein the one or more instructions, when executed, further cause the processor to run one or more flow tests to measure productivity of the generated one or more images.

19. The non-transitory computer readable medium of claim 14, wherein performing the simulation further comprises reducing pressure in the simulated wellbore case to allow flow of a fluid from the perforation.

20. The non-transitory computer readable medium of claim 19, wherein the one or more instructions, when executed, further cause the processor to measure flow rate of the fluid from the perforation.

* * * * *